United States Patent [19]

Hashimoto et al.

[11] Patent Number: 4,723,138
[45] Date of Patent: Feb. 2, 1988

[54] IMAGE DISPLAY APPARATUS

[75] Inventors: Norio Hashimoto, Tokyo; Kazuyoshi Chiku, Yokohama, both of Japan

[73] Assignee: Canon Kabushiki Kaisha, Tokyo, Japan

[21] Appl. No.: 720,609

[22] Filed: Apr. 8, 1985

[30] Foreign Application Priority Data

| Apr. 10, 1984 | [JP] | Japan | 59-71323 |
| Apr. 27, 1984 | [JP] | Japan | 59-83878 |
| Jun. 28, 1984 | [JP] | Japan | 59-131867 |
| Jun. 28, 1984 | [JP] | Japan | 59-131868 |
| Jun. 28, 1984 | [JP] | Japan | 59-131869 |

[51] Int. Cl.$^4$ ............... G01D 15/14; G03G 21/00
[52] U.S. Cl. ............................ 346/160; 355/5; 358/300
[58] Field of Search ............ 355/3 R, 5, 7, 40, 46; 346/160, 161; 340/783, 792; 358/300

[56] References Cited

U.S. PATENT DOCUMENTS

| 3,473,451 | 10/1969 | Greenly et al. | 355/40 X |
| 3,519,344 | 7/1970 | Clark et al. | 355/5 |
| 4,315,684 | 2/1982 | Sugiura et al. | 355/40 X |
| 4,541,706 | 9/1985 | Kishi | 355/5 X |
| 4,547,787 | 10/1985 | Kaneko et al. | 346/160 |
| 4,588,990 | 5/1986 | Tamura | 346/160 X |

FOREIGN PATENT DOCUMENTS 58-223160 12/1983 Japan ........................ 355/5

*Primary Examiner*—Fred L. Braun
*Attorney, Agent, or Firm*—Fitzpatrick, Cella, Harper & Scinto

[57] ABSTRACT

An image display apparatus includes a first image carrier along with an apparatus for inputting an image signal. An erasable image is formed on the first image carrier in accordance with the image signal input from the image signal input apparatus. A display area displays the image formed on the first image carrier. A second image carrier, which is associated with the first image carrier, contains a visible image which is photoelectrically read and converted to an image signal. The visible image carried on the second image carrier is automatically erased after the visible image is converted to an image signal.

15 Claims, 11 Drawing Figures

IMAGE DISPLAY APPARATUS

BACKGROUND OF THE INVENTION

1. Field of the Invention

The present invention relates to an image display apparatus for displaying data of a computer or a facsimile, and more particularly to an apparatus which forms and displays an image on a repetitively usable image carrier which carries an erasable image thereon.

2. Description of the Prior Art

A CRT display has been widely used a the image display apparatus for displaying data of the computer or facsimile. In such a CRT display, when an image is to be added to a displayed image, the additional information is input by a light pen, a digitizer or character keys. Since it requires means for converting the additional information to electrical signals and a large capacity memory, the apparatus is complex in construction and expensive. Further, when such additional image information input system is used, the types of image information which can be input are limited or a resolution of the input image is relatively low.

The assignee of the present application has proposed an image display apparatus which uses a moving belt-like image carrier to replace with the prior art image display apparatus. Such proposed apparatus is shown in FIG. 1, in which numeral 1 denotes a housing, numeral 2 denotes a display unit mounted in the housing 1, numeral 3 denotes a display window of the display unit 2, numeral 4 denotes a rigid transparent member such as acrylate plate or glass plate mounted on the display window 3, numeral 5 denotes a laser beam scanner, numeral 6 denotes an f−θ lens, numeral 7 denotes a reflection mirror, and numeral 8 denotes an endless belt-like photoconductor (or photosensitive belt) (hereinafter referred to as belt photoconductor) which is an image carrier guided in the housing 1 by guide rollers 9, 10, 11 and 12 and intermittently driven by drive means (not shown) which is coupled to at least one of guide roller shafts.

An output light from a semiconductor laser (not shown) which is modulated by an image electrical signal is scanned in one direction by the scanner 5 and illuminates a back side of the belt photoconductor 8 through the f−θ lens 6 and the mirror 7. The photoconductor 8 may comprise a photoconductive layer formed on a transparent and conductive substrate.

A developing unit 15 including a sleeve 17 having a toner carrying magnet 16 rotating in a direction of an arrow mounted therein is arranged to face a surface of the belt photoconductor 8 at an exposure position A, and conductive and magnetic developers (toners) 18 supplied onto the sleeve surface contact to the photoconductor surface while they are uniformly regulated by a blade 19. A D.C. voltage from a D.C. power supply (see FIGS. 2 and 3) is applied across the sleeve 17 of the developing unit 15 and the substrate of the photoconductor 8. Rollers 13 and 14 ar arranged in the vicinity of the exposure/develop position so that the belt photoconductor 8 is kept planar and a distance between the photoconductor surface and the sleeve 17 of the developing unit 15 is precisely kept constant. In this manner, the toner image written on the surface of the belt photoconductor 8 by the beam irradiation at the position A facing the developing unit 15 is transferred to the display unit 2.

The display unit 2 has the rectangular window 3 formed on the front side of the housing 1 so that the toner image on the photoconductor can be externally viewed through the transparent member 4 which covers the window 3. The photoconductor 8 is automatically or manually stopped for a desired time period when a desired visible image area comes under the window 3. Thus, the stationary toner image on the photoconductor can be viewed through the window 3 and the transparent member 4.

Numeral 20 denotes a lamp for erasing hysteresis on the photoconductor 8. It is mounted downstream of the exposure position A to face the back side of the photoconductor 8. It is turned on while the belt photoconductor 8 is moved, and turned off when it is stopped. Numeral 21 denotes a console arranged on the housing 1 below the display unit 2 to instruct various operations. It includes a plurality of buttons to instruct the movement and the stop of the photoconductor 8.

FIGS. 2 and 3 illustrate a principle of image formation on the belt photoconductor 8 of the apparatus of FIG. 1.

FIG. 2 shows charges in a light area of the information light (laser beam) LB. When the toners 18 having the D.C. voltage applied thereto through the sleeve 17 contact to the photoconductor 8, an electric field is applied to the transparent conductive layer 8b of the photoconductor 8. If the information light transmitted through the transparent substrate (for example polyethylene telepthate film) 8a is irradiated to the conductive layer 8b, photo-carriers e are created in the photoconductive layer 8c and are guided to the vicinity of the surface of the photoconductive layer 8c under the action of the electric field. As a result, a strong electrostatic attractive force acts between the conductive and magnetic toners 18 and the photoconductive layer 8c so that the toners 18 are deposited on the photoconductive layer 8c or the photoconductor 8.

In the illustrated example, the photoconductive layer 8c is an N-type semiconductor and a positive voltage is applied to the toners 18 so that the negative carries e created in the vicinity of the substrate 8a in the photoconductive layer 8c by the irradiation of the information light LB are guided toward the surface of the photoconductive layer 8c. As a result, a strong electrostatic attractive force acts between the positive toners 18 and the photoconductor 8 and the toners 18 are deposited to the photoconductor 8.

FIG. 3 illustrates charges in a dark area. The electrostrictive force acts between the toners 18 and the transparent conductive layer 8b by the electric field applied therebetween but the force is small because of a long distance therebetween and the presence of the photoconductive layer 8c therebetween. Accordingly, the toners 18 are removed from the surface of the photoconductive layer 8c or the photoconductor 8 by the magnetic force of the rotating magnet 16 arranged in the stationary sleeve 17 and the deposition force among the magnetic toners 18.

A new image can be formed on the photoconductor 8 by passing the toner image through the exposure position A. When the toner holding area on the photoconductor 8 changes to the toner non-holding area, the electrostatic attractive force of the toners 18 reduces and the toners 18 are removed by the magnetic field of the magnet 16 and a light area without toner deposition is created. The developing unit 15 also serves as cleaning means. On the other hand, when the toners are to be retained, the carriers e are again injected by the information light LB and the toners 18 are attracted against the magnetic field of the rotating magnet 16 so that the toners 18 are retained. Accordingly, the toner image on the photoconductor surface does not adversely affect to the formation of the next image and hence no separate cleaning means is required.

In another system in which the endless belt-like image carrier is intermittently moved to form and display the image, a thermo-sensitive record medium made of $Ag_2HgI_4$ which is a compound of silver, mercury and iodine is used as the belt and a thermal recording head is used as the image forming means.

In the image display apparatus of the type described above, when a new image is to be added to the existing toner image, the toner image must be additionally formed on the belt photoconductor. However, in the above process, it is not possible to add the information without erasing the existing toner image. In the above display system, it is necessary to convert the additional information to an electrical signal in order to form the additional information on the photoconductor. This leads to the complexity of the construction of the apparatus as it is in the CRT display system.

In the above image display apparatus, the input image information signal is stored in an information storage medium such as an optical disc or a memory in a form of electrical signal. In order to additionally input the image signal to such electrical signal image information, it is necessary to visualize the electrical signal image information by the image display apparatus to allow visual observation by an operator, input the additional image information by some means and convert it to an electrical signal and transfer it to the information recording medium or the memory.

In the image display apparatus shown in FIG. 1, there is no means for additionally inputting the image information nor means for converting the additional input image to an electrical signal.

SUMMARY OF THE INVENTION

It is an object of the present invention to remove the drawbacks as above-mentioned.

It is another object of the present invention to improve an image display apparatus.

It is another object of the present invention to provide an image display apparatus capable of additionally inputting a new image.

It is another object of the present invention to provide an image display apparatus having a function to read a displayed image.

It is other object of the present invention to provide an image display apparatus which can simultaneously display an image formed on an image carrier and image information to be added.

It is other object of the present invention to provide a low cost image display apparatus of a simple construction which can simply input image information to be added.

It is other object of the present invention to provide an image display apparatus which can convert additionally input image information to a electrical signal.

It is other object of the present invention to provide an inexpensive image display apparatus of a simple construction.

It is other object of the present invention to provide an image display apparatus which converts additionally input information to an electrical signal, separates it from other image information and records or stores it.

It is other object of the present invention to provide an image display apparatus which can convert displayed image information and additionally input image information to a common image information electrical signal.

It is other object of the present invention to provide an image display apparatus which can convert one or both of displayed image information and additionally input image information to an electrical signal.

It is other object of the present invention to provide an image display apparatus which can convert image information displayed on a carrier and additionally input image information to an electrical signal of composite image information and read the image without disturbing a relative positional relation of the original image and the additional image.

Other objects of the present invention will be apparent from the following description of the invention and the appended claims.

DETAILED DESCRIPTION OF THE PREFERRED EMBODIMENTS

Figure 1:
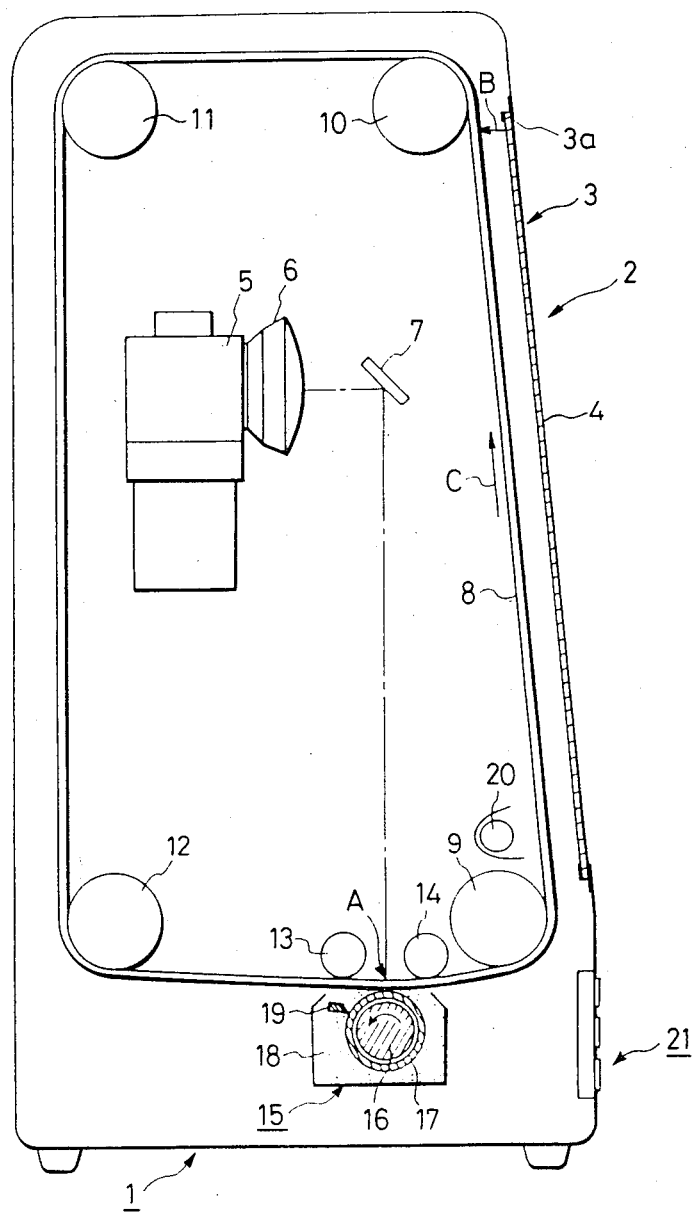
FIG. 1 is a sectional view of a prior art electronic photographic display apparatus.
Figure 2:
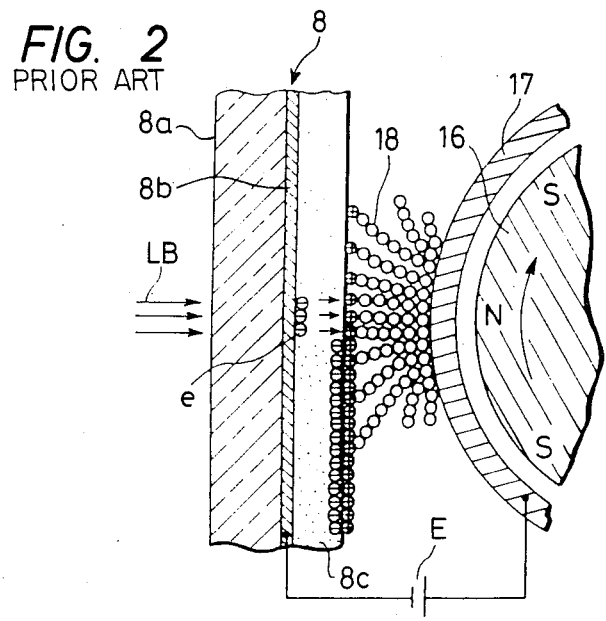
FIGS. 2 and 3 illustrate a principle of image formation in the display apparatus of FIG. 1.
Figure 3:
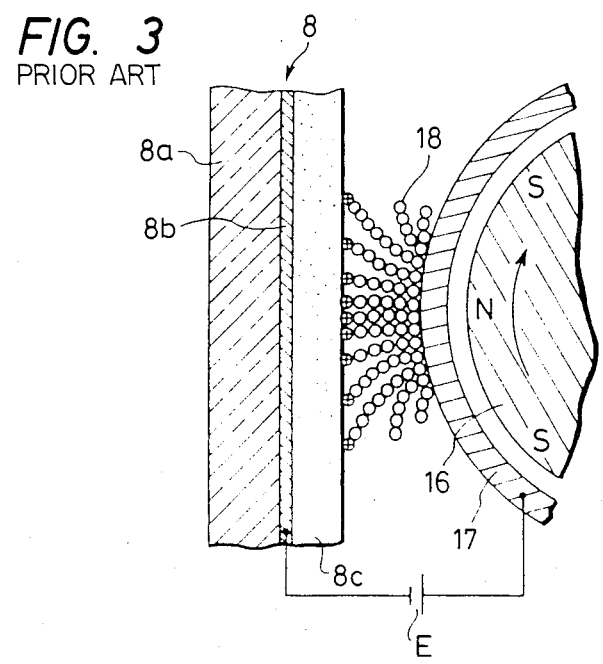
Figure 4:
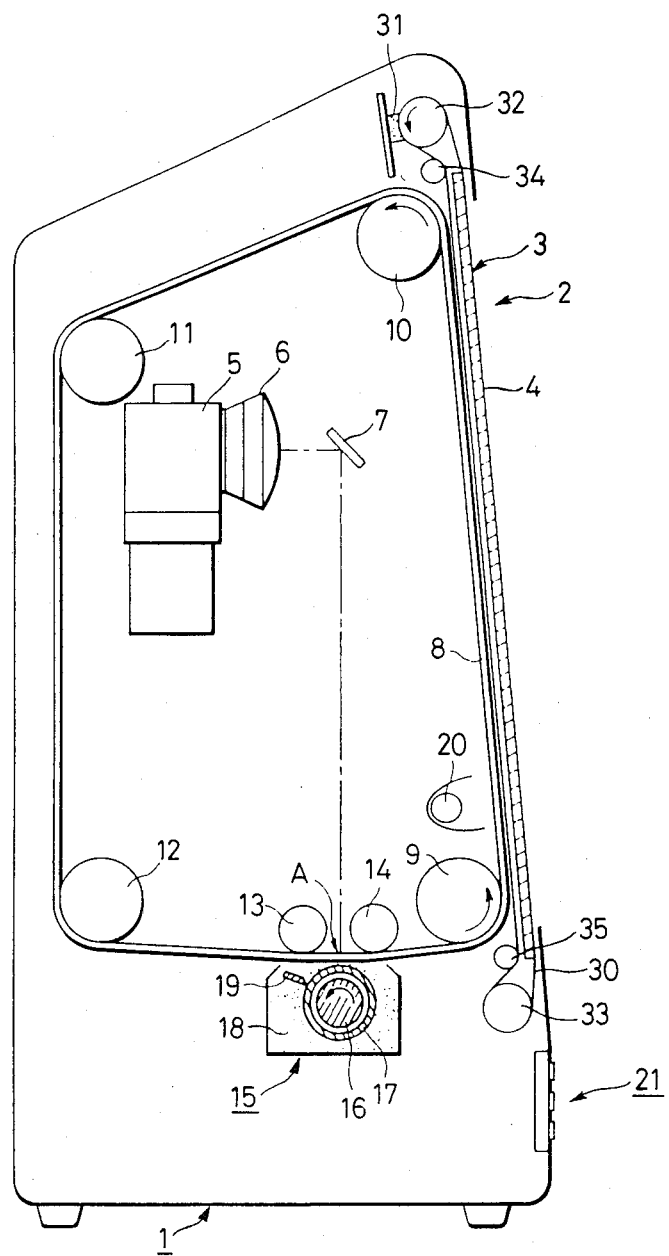
FIG. 4 is a sectional view of a first embodiment of the present invention.

Referring to FIG. 4, a first embodiment of the present invention is explained. In FIG. 4, the like elements to those shown in FIG. 1 are designated by the like numerals. The image forming process for visualizing image information in an electrical signal to display it on a belt photoconductor (first image carrier) 8 is similar to that described above. Numeral 30 denotes a transparent flexible sheet member (second image carrier) which carries additional information, is adjacent to the transparent member 4 and is supported by rollers 32, 33, 34 and 35, at least one of which serves as a drive roller. (In the illustrated embodiment, the roller 32 serves as the drive roller). Numeral 31 denotes a cleaning member which is a resilient member such as felt which is press-contacted to a surface of the sheet member 30 and erases an image formed on the surface of the sheet member 30.

The sheet member 30 is endless and moved along a front surface and a back surface of the transparent member 4 and a portion thereof which faces the display area of the photoconductor 8 is parallel to the display area. As the roller 32 is driven in a direction of an arrow, the sheet member 30 is moved vertically upward along the front surface of the transparent member 4 and vertically downward along the back surface of the transparent member 4. The rollers 34 and 35 are mounted on the housing 1 to apply a constant tension to the sheet member 30 and space the sheet member 30 from the photoconductor 8 by a constant distance. The spacing between the sheet member 30 and the photoconductor 8 is selected such that the toner image on the photoconductor 8 is not adversely affected by the sheet member and preferably it is as small as possible. The transparent member 4 is a glass plate having a plane which is parallel to the display area of the photoconductor 8 and arranged in the endless feed path of the photoconductor 8. It is arranged as closely to the photoconductor 8 as possible.

The sheet member 30 is a synthetic resin sheet such as transparent polyethylene or polyvinyl chloride used in an overhead projector (OHP) on which information can be written by a marking pen such as a felt pen and the written information can be erased.

In the present apparatus, when the visual signal image information is visualized (as a toner image) on the photoconductor 8 by the above image forming process and the toner image is displayed on the display area 2, a viewer can optically view the toner image through the transparent member 4 and the sheet member 30. When additional information such as characters, numerals, a graphic pattern, symbols or underlines is to be added to the toner image, the additional information is written on a predetermined area of the sheet member 30 by a felt pen. Accordingly, the viewer can view an optically composite image of the toner image formed on the photoconductor 8 and the ink image written on the sheet member 30. The display area 2 is illuminated by a lamp (not shown) so that the viewer can view reflected images of the photoconductor 8 and the sheet member 30. Because of a gap between the photoconductor 8 and the sheet member 30, there may be a certain viewing error depending on a viewing angle. However, it does not cause a problem because the viewer views the composite image from the front.

When the image written on the sheet member 30 is to be corrected, the ink image on the sheet member 30 is traced by a commercially available erase pen or cloth so that it is partially erased. When the ink image on the sheet member 30 is to be erased after the viewing of the displayed image, the roller 32 is driven and the ink image is erased by the cleaning member 31. Thus, the sheet member can be repeatedly used. The roller 32 is driven or stopped by energizing or deenergizing a motor (not shown) by an actuation key on the console 21. When all of the additional information on the sheet member 30 have been erased, the roller 32 is stopped and then a new image is formed on the photoconductor 8. When it is displayed, additional information can be written.

Figure 5:
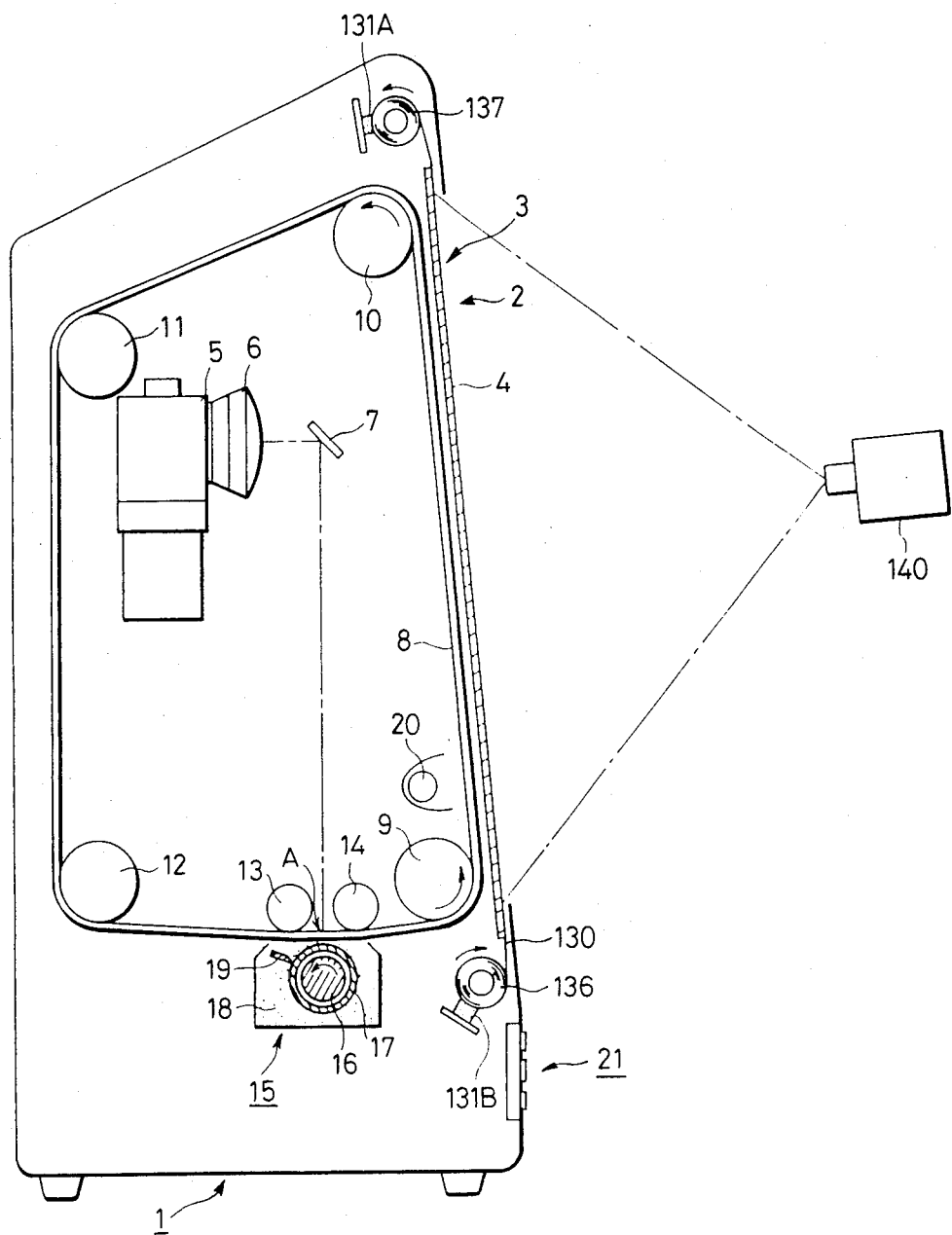
FIG. 5 is a sectional view of a second embodiment.

FIG. 5 shows a second embodiment of the present invention. It is different from the embodiment of FIG. 4 in that the sheet member is not endless. In FIG. 5, the like elements to those shown in FIG. 4 ar designated by the like numerals and the explanation thereof is omitted. Numeral 130 denotes a transparent sheet member on which information can be written, numerals 136 and 137 denote drive rollers, numerals 131A and 131B denote cleaning members and numeral 140 denotes a camera. The cleaning members 31A and 131B are made of the same material as the cleaning material 31 of FIG. 4. The sheet member 130 is made of the same material as the sheet member 30 of FIG. 4, is flexible and arranged to be moved parallel to the display plane of the photoconductor 8 along the surface of the transparent member 4.

The sheet member 130 has a length which is more than two times of the vertical length of the display area 2 and one end thereof is fixed to a drive roller 136 while the other end thereof is fixed to a drive roller 137 and is wrapped around the drive rollers 136 and 137. The drive rollers 136 and 137 are coupled to motors. When the sheet member 130 is to be moved upward, the drive roller 137 is driven counterclockwise so that the sheet member 130 is taken up by the drive motor 137, the ink image on the sheet member 130 is erased by the cleaning member 131A as the sheet member 130 is moved upward. On the other hand, when the sheet member 130 is to be moved downward, the drive roller 136 is driven clockwise so that the sheet member 130 is taken up by the drive roller 136 and the ink image on the sheet member 130 is erased by the cleaning member 131B as the sheet member 130 is moved downward. When a composite image of the toner image on the photoconductor 8 and the ink image on the sheet member 130 is to be recorded and retained, the composite image is photographed by the camera 140 which may be a known microfilm camera or a television (video) camera. The photographed image may be recorded on a microfilm or a magnetic tape.

In the present embodiment, the image formed on the image carrier in accordance with the electrical signal image information and the additional information to be added to the formed image can be simultaneously displayed. Means for converting the additional information to an electric signal or the large capacity memory required in the prior art CRT display system is not necessary, the apparatus is simple in construction and inexpensive, and the additional information can be simply written and corrected.

Figure 6:
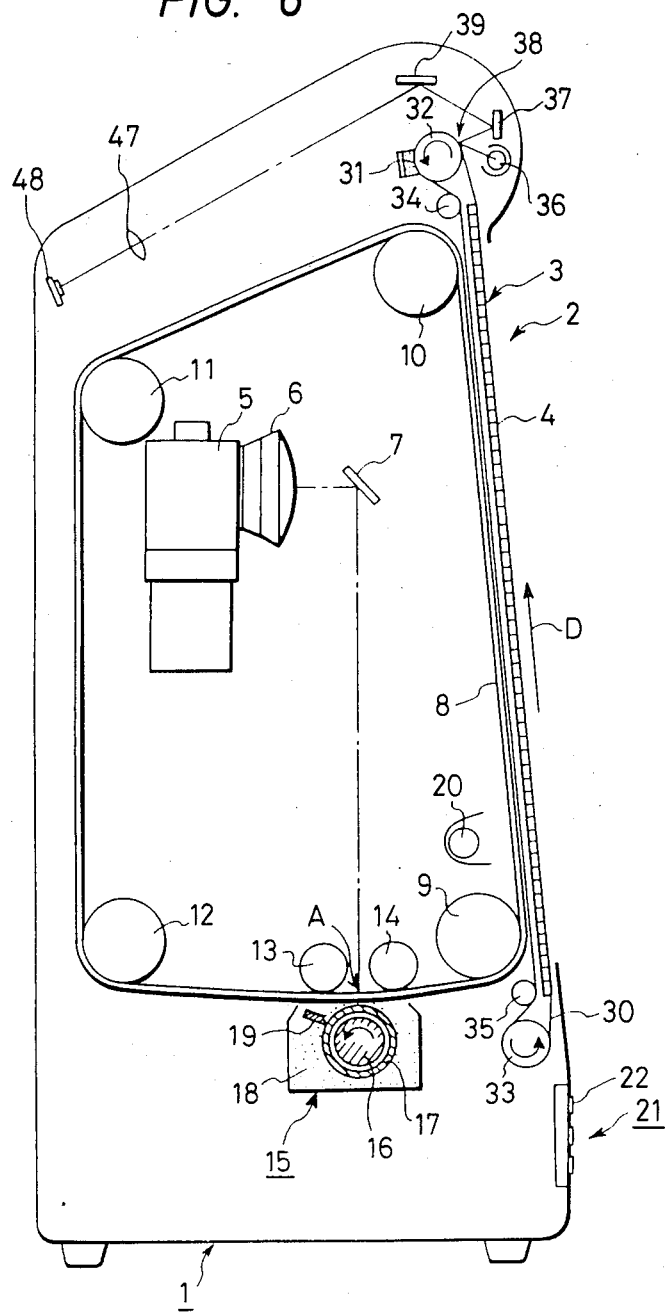
FIG. 6 is a sectional view of a third embodiment.

FIG. 6 shows a third embodiment of the image display apparatus of the present invention. Thus, FIG. 6 shows an apparatus having a reader of an additional image in addition to the device illustrated in FIG. 4. The like elements to those shown in FIG. 4 are designated by the like numerals. Numerals 32 to 35 denote rollers and numeral 30 denotes an endless transparent film such as a polyester film or polyethylene film. The transparent film 30 serves as a second image carrier on which additional information is to be written. It extends under the transparent member 4 on the display window 3 and is supported by the four rollers 32 to 35. When one (e.g. 32) of the rollers is driven, the transparent film 30 is moved in a direction of an arrow D.

The transparent film 30 is arranged closely to the belt photoconductor 8 which serves as a first image carrier for visualizing electrical signal image information into a visual image. Thus, the image carried on the belt photoconductor 8 can be externally viewed from the display window 3 through the transparent film 30 and the transparent member 4. Since a portion of the transparent film 30 essentially contacts to the front surface of the rigid transparent member 4, an image can be hand-written on the transparent film 30 on the display window 3, and the additional image on the transparent film 30 and the image carried on the belt photoconductor 8 are optically superimposed and viewed.

In the present embodiment, the user can add the image on the transparent film 30 while he/she views the image carried on the belt photoconductor 8 to view the composite image.

When the drive roller 32 is driven after the writing of the additional image, the transparent film 30 is moved in the direction of the arrow D. The drive roller 30 is driven by actuating an actuation button on the console 21.

When the image recorded on the transparent film 30 reaches the exposure position 38 as the transparent film 30 is moved, the light emitted from the illumination lamp 36 illuminates the image, a reflected image is reflected by the reflection mirrors 37 and 39 and it is focused onto a charge coupled device (CCD) 48 by a focusing lens 47.

Since the surface of the drive roller 32 is white and the image on the transparent film 30 is written by color ink, the CCD 48 reads the image information on the transparent film 30 by a contrast between the ink color and the white color on the surface of the drive roller 32, and converts it to an analog electrical signal in accordance with the contrast. While the image is read by the CCD 48, the transparent film 30 is moved. Thus, the image on the transparent film 30 is wholly scanned by the CCD 48 and converted to an electrical signal.

The ink image written on the transparent film 30 passes through the exposure unit 38 and then cleaned and removed by the downstream cleaning member 31 which is soft material such as sponge or felt with alcohol impregnated therein. The cleaning member 31 is press-contacted to the drive roller 32 so that the image on the transparent film 30 is swept off by the cleaning member 31. In this manner, the image on the transparent film 30 is fully removed and the transparent film 30 is then ready for the next image input.

Figure 7:
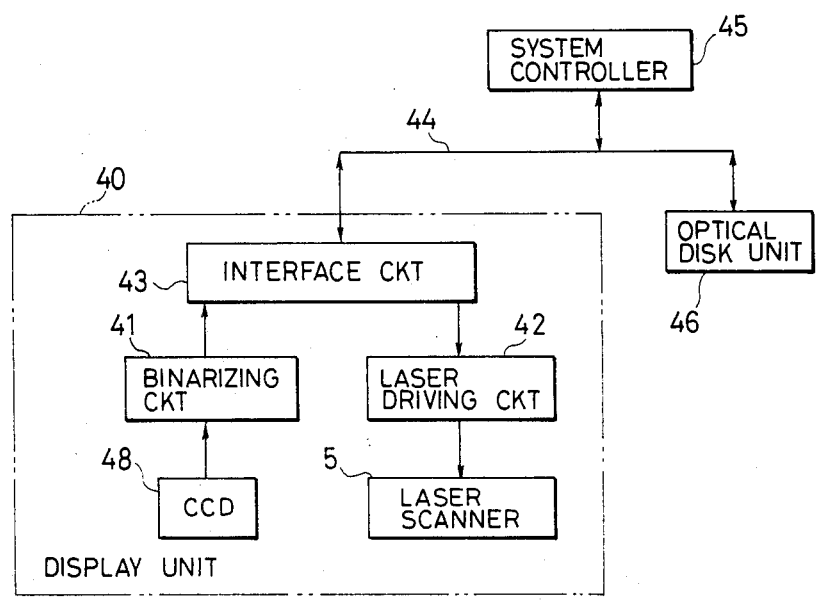
FIG. 7 shows a signal processing unit of the third embodiment

FIG. 7 shows a configuration of a signal processing system in the apparatus of FIG. 6. Numeral 40 denotes the overall image display apparatus which comprises, in addition to the CCD 48 and the laser scanner of FIG. 6, a binarizing circuit 41 for converting the analog signal output by the CCD 48 to a binary signal, a laser drive circuit 42 for generating a laser beam in accordance with the image information and an interface circuit 43 for exchanging signals with an external device. Numeral 44 denotes a common bus line, numeral 45 denotes a system controller for controlling the overall system and numeral 46 denotes an optical disk unit for storing image information in a form of an electrical signal. Those system controller 45, optical disk unit 46 and interface circuit 43 are connected to the common bus line 44.

The system controller 45 transfers information between the image display apparatus 40 and the optical disk unit 46, controls the operations of the respective units and reads in the information on the bus line 44 to process them.

The optical disk unit 46 records the electrical signal information on an optical disk which is an information storage medium and reads the information stored in the optical disk as the electrical signal and sends it out to the bus line 44.

The image information written on the transparent film 30 is converted to an analog signal by the CCD 48 and the analog electrical signal is converted to a digital signal by the binarizing circuit 41 which outputs the digital signal to the bus line 44 through the interface circuit 43. The digital signal is then sent to the optical disk unit 46 through the system controller 45 and stored in the optical disk by the optical disk unit 46.

The image information stored in the optical disk is read by the optical disk 46, read into the image display apparatus 40 through the bus line 44, supplied to the laser drive circuit 42 through the interface circuit 43 and visualized on the belt photoconductor 8 by the laser scanner 5.

The image written on the transparent film 30 is separated from other image information and stored in the optical disk of the optical disk unit 46. The stored information is read from the optical disk as required and displayed on the image display apparatus 40 or supplied to the system controller 45 as the image information. In order to attain the above function, the present embodiment does not need a large capacity memory in the display apparatus and hence the apparatus is relatively inexpensive.

In the present embodiment, the belt photoconductor 8 is used as the first image carrier. Alternatively, an image carrier of another type of image display apparatus (for example, a CRT display or a liquid crystal display) may be used as the first image carrier.

In the present embodiment, the transparent film 30 is used as the second image carrier so that the images carried on the first and second image carriers can be viewed in superposition. Such a construction is not essential but it is sufficient that at least the image on the second image carrier can be read. Accordingly, the second image carrier need not be limited to transparent film.

In accordance with the present embodiment, the additionally input image information can be separated from other image information and converted to the electrical signal.

Figure 8:
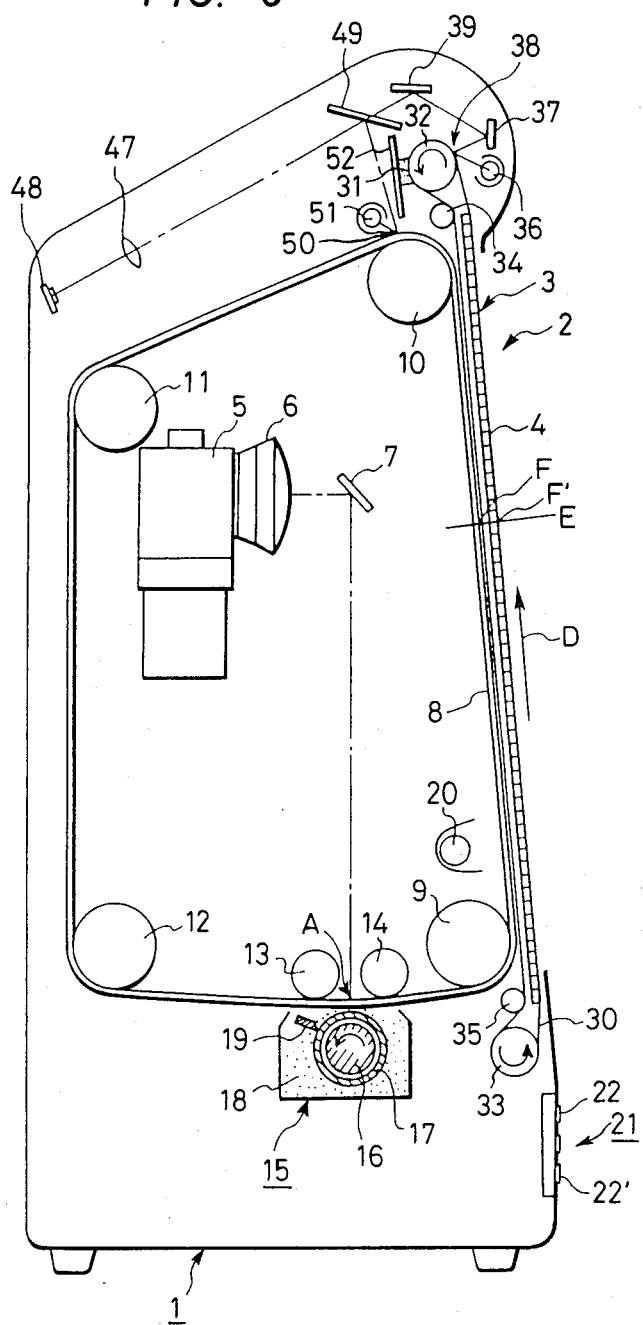
FIG. 8 is a sectional view of a fourth embodiment.

A fourth embodiment of the present invention is explained with reference to FIGS. 7 to 9. FIG. 8 shows a construction of the fourth embodiment of the image display apparatus of the present invention in which the like elements to those shown in FIGS. 4 and 6 are designated by the like numerals and the explanation thereof is omitted.

The apparatus of FIG. 8 can read both the image on the photoconductor 8 and the additional image on the transparent film 30. As described before, the user can write the additional information on the transparent film 30 and view it while he/she views the image carried on the belt photoconductor 8. After writing of the additional information, the actuation button on the console 21 is actuated so that the belt photoconductor 8 and the transparent film 30 are driven at the same speed in the direction of the arrow D.

Numeral 38 denotes an exposure area on the transparent film 30, numeral 36 denotes an illumination lamp for illuminating the exposure area 38, numerals 37 and 39 denote reflection mirrors for deflecting a direction of a light path, numeral 49 denotes a half-mirror for combining the reflected light images, numeral 47 denotes a focusing lens, numeral 48 denotes a charge coupled device (CCD) for converting the composite light image to an electrical signal, numeral 50 denotes an exposure area on the belt photoconductor 8 and numeral 51 denotes an illumination lamp for illuminating the exposure area 50.

When the image written on the transparent film 30 reaches the exposure area 38 as the film 30 is moved, the light emitted from the illumination lamp 36 illuminates the image, and the reflected image thereof is reflected by the reflection mirrors 37 and 39 and directed to the half-mirror 49. Since the surface of the drive roller 32 is white and the image on the transparent film 30 is written by color ink, the reflected image has a contrast due to the color of the ink and the white surface of the drive roller 32.

On the other hand, when the image on the belt photoconductor 8 reaches the exposure area 50 as the photoconductor 8 is moved, it is illuminated by the illumination lamp 51 and the reflected image is directed to the half-mirror 49.

Since the photoconductor 8 and the transparent film 30 are simultaneously moved at the same velocity in the same direction, a light path length from the exposure area 50 on the photoconductor 8 to the half-mirror 49 and a light path length from the exposure area 38 on the transparent film 30 to the half-mirror 49 via the reflection mirrors 37 and 39 are set to be equal.

Accordingly, the light image of the reflected image from the transparent film 30 which is transmitted through the half-mirror 49 and the light image of the reflected image from the belt photoconductor 8 which is reflected by the half-mirror 49 are optically superimposed and combined, and the composite image is focused onto the CCD 48 by the focusing lens 47.

In the display area 2, a position on the belt photoconductor 8 on a viewing line E is designated by F and a position on the transparent film 30 on the same line E is designated by F'. If a path length on the belt photoconductor 8 from the point F to the exposure area 50 and a path length on the transparent film 30 from the point F' to the exposure area 38 are equal, the images which are on the same viewing line E in the display area 2 are combined into the same position by the half-mirror 49 and the composite image is read by the CCD 48. Since the transparent film 30 and the belt photoconductor 8 are moved while the image is read by the CCD 48, the images carried on the carriers 8 and 30 are scanned by the CCD and converted to electrical signals.

Numeral 52 denotes a light shielding plate which prevents the illumination light and the reflected lights from the illumination lamps 51 and 36 from merging in the light paths leading to the half-mirror 49.

The image written by the ink on the transparent film 30 passes through the exposure area 38 and then cleaned and removed by the downstream cleaning member 31 fixed to the light shielding plate 52. The cleaning member 31 is made of soft material such as sponge or felt with alcohol impregnated therein. Since it is press-contacted to the drive roller 32, the image on the transparent film 30 is swept off by the cleaning member 31. In this manner, the image on the transparent film 30 is removed and the transparent film 30 is ready for the next image input.

With the reader described above, the optically composite image of the image carried on the belt photoconductor 8 and the image carried on the transparent film 30 is read by the CCD 48. In the present embodiment, the signal processing system of FIG. 7 may be used. In the circuit of FIG. 7, the image information written on the transparent film and the photoconductor 8 are converted to the analog signal by the CCD 48, and the analog signal is converted to a digital signal by the binarizing circuit 41, sent out to the bus line 44 through the interface circuit 43 and supplied to the optical disk 46 through the system controller 45, and stored in the optical disk by the optical disk unit 46.

The image information stored in the optical disk is read by the optical disk unit 46, read into the image display apparatus 40 through the bus line 44, supplied to the laser drive circuit 42 via the interface circuit 43 and visualized on the belt photoconductor 8 by the laser scanner 5.

The composite image information read by the CCD 48 by optically superimposing the image carried by the belt photoconductor 8 and the additional image written on the transparent film 30 can be separately stored on the optical disk of the optical disk unit 46 from other image information, and the stored information is read from the optical disk as required and displayed on the image display apparatus 40 or supplied to the system controller 45 as the image information.

In order to achieve the above function, the present embodiment does not need a large capacity memory in the display apparatus and hence the apparatus is relatively inexpensive.

In the present embodiment, the belt photoconductor 8 is used as the first image carrier. Alternatively, an image carrier of another type of image display apparatus (for example, a CRT display or a liquid crystal display) may be used as the first image carrier.

In the above embodiment, the transparent film 30 is used as the second image carrier so that the images carried by the first and second image carriers are viewed in superposition. This construction is not essential but it is sufficient if the images on the first and second image carriers can be read. The second image carrier need not be transparent film. It may be a film having a white area which is as large as one screen area, or the image additionally written on the transparent member may be read by the CCD.

In accordance with the present embodiment, the image information additionally input and the image information displayed on the photoconductor are combined and the composite image information is converted to single image information in the form of electrical signals.

In FIG. 8, the path length on the belt photoconductor 8 from the point F to the exposure area 50 and the path length on the transparent film 30 from the point F' to the exposure area 38 are equal. This causes the following problems. There is no freedom in mechanical design and the composite image at the reader is significantly affected by the mechanical precision.

Figure 9:
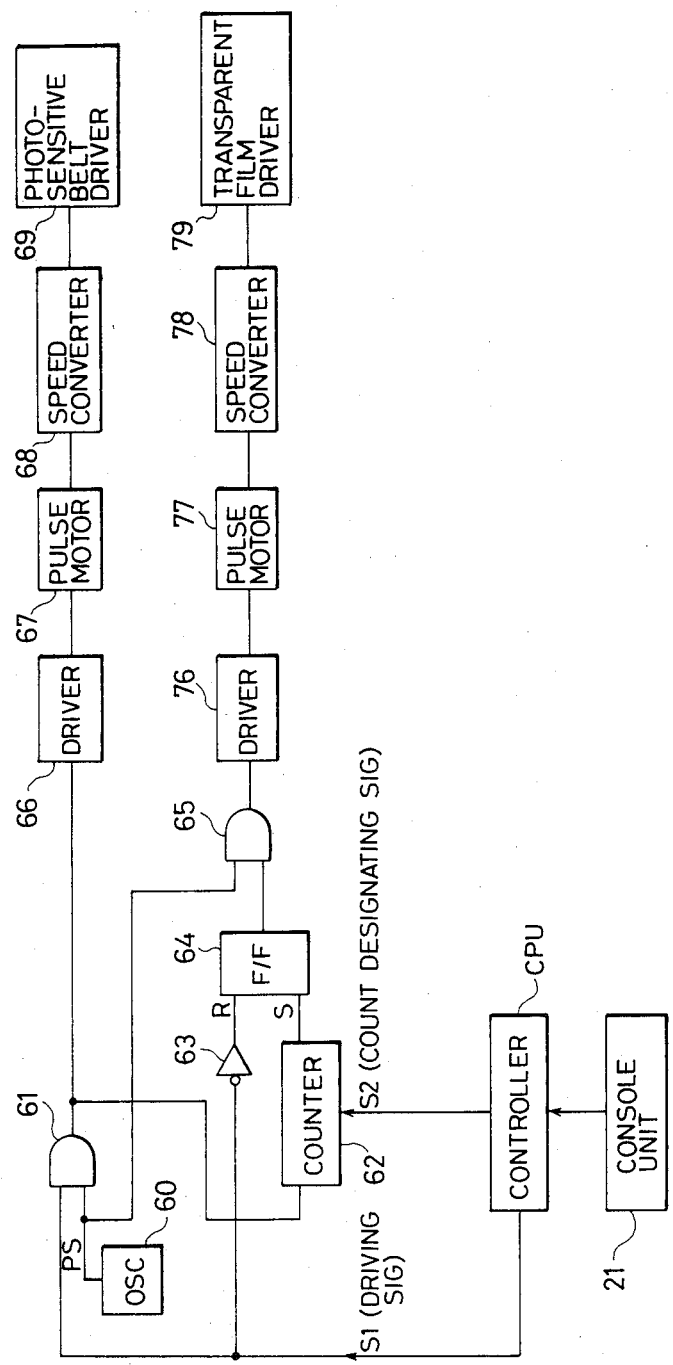
FIG. 9 shows a drive control circuit which drives a belt photoconductor 8 and a transparent film 30 of FIG. 8.

In order to resolve the above problems, a control circuit shown in FIG. 9 is provided, which assures accurate read operations even when the path length on the belt photoconductor 8 from the point F to the exposure area 50 and the path length on the transparent film 30 from the point F' to the exposure area 38 are not equal.

In FIG. 9, numeral 60 denotes an oscillator for generating a drive pulse PS at a predetermined frequency, numeral 61 denotes an AND gate which is conditioned by a drive signal S1 from the controller CPU to gate the pulse PS, numeral 62 denotes a counter which is preset by a count preset signal from the controller CPU and counts up output pulses of the AND gate 61 applied thereto and produces an output pulse when the count reaches the preset count, numeral 63 denotes an inverter which inverts the drive signal S1, numeral 64 denotes a flip-flop (F/F) which is set by the output signal from the counter 62 and reset by the inverted signal from the inverter 63, and numeral 65 denotes an AND gate which is conditioned by the output from the F/F 64 to gate the drive pulse PS of the oscillator 60.

A pulse motor 67 is driven by a driver 66 which is driven by the pulse from the AND gate 61. The rotation of the pulse motor 67 is transmitted to a belt photoconductor driver 69 through an appropriate speed converter 68 such as a series of reduction gears so that the belt photoconductor is moved at the predetermined speed. A pulse motor 77 is driven by a driver 76 which is driven by the pulse from the AND gate 65. The rotation of the pulse motor 77 is transmitted to a transparent film driver 79 through a speed converter 78 such as a series of reduction gears so that the transparent film 30 is moved at the same speed as the belt photoconductor 8.

Since the AND gate 65 is conditioned by the output signal of the F/F 64 which is set by the output of the counter 62, it produces the output later than the AND gate 61 by a time corresponding to the count preset by the count preset signal S2.

Let us now assume that the path length on the belt photoconductor 8 from the point F to the exposure area 50 is longer than the path length on the transparent film 30 from the point F' to the exposure area 38. In this case, if the carriers 8 and 30 are synchronously moved at the same speed, the points F and F' which are on the same viewing line E in the display area 2 do not reach the exposure areas 50 and 38 at the same time. As a result, the optically composite image on the CCD 48 is different from the composite image viewed in the display area 2. In the present embodiment, the start time of the movement of the transparent film 30 is delayed by the control circuit of FIG. 9 by the time corresponding to the difference between the path lengths. Thus, the image points at the points F and F' can reach the exposure areas 50 and 38, respectively, at the same time.

When the additional input image for the image carried on the belt photoconductor 8 is carried on the transparent film 30 and the composite image of both images is to be read by the CCD 48, a read designation key on the console 21 is depressed. The designation signal is sent to the controller CPU which sends the count preset signal S2 to the counter 62 and also outputs the drive signal S1. The drive signal S1 conditions the AND gate 61 which gates the pulse PS supplied from the oscillator 60. The pulse PS from the AND gate 61 drives the pulse motor 67 through the driver 66. The rotation of the pulse motor 67 is transmitted to the belt photoconductor driver 69 so that the belt photoconductor 8 is moved at the predetermined speed.

The output pulse PS from the AND gate 61 is applied to the counter 62 which counts up the input pulses. The drive signal S1 is supplied to a reset input terminal of the F/F 44 through the inverter 63. The F/F 64 is not set until a set pulse is applied from the counter 62. Accordingly, the AND gate 65 is not conditioned, the driver 76 is not activated and the transparent film driver 79 is kept deactivated and the transparent film 30 remains stopped.

The output pulses from the AND gate 61 are sequentially supplied to the counter 62, and when the number of pulses input reaches the count preset by the count preset signal S2, the set pulse is supplied from the counter 62 to the set input terminal of the F/F 64 so that the F/F 64 is set. As a result, the AND gate 65 is conditioned the pulse is applied to the driver 76, the transparent film driver 79 is activated and the transparent film 30 starts to be moved later than the start time of the movement of the belt photoconductor 8 by the time corresponding to the preset count which is determined by the difference between the path lengths on the carriers 8 and 30.

Since the start times of the movement of the carriers 8 and 30 are controlled in this manner, the image points at the points F and F' can reach the exposure areas 50 and 38, respectively, at the same time even if the path length on the belt photoconductor 8 from the point F to the exposure area 50 in FIG. 8 and the path length on the transparent film 30 from the point F' to the exposure area 38 are not equal. Accordingly, the optically composite image at the CCD 48 is not different from the optical composite image at the display area 2.

In the embodiment of FIG. 9, the pulse motor drive system is used as the drive means. Alternatively, a synchronous motor may be used, or a DC or AC servo motor with an appropriate servo system may be used. The count preset signal S2 supplied by the controller CPU to the counter 62 may be varied by the controller CPU so that any mechanical errors of the carriers can be compensated. For example, reference marks are recorded on the carriers 8 and 30 at positions upstream of the points F and F' of FIG. 8, and if the CCD 48 does not read those reference marks at the same time, the controller CPU increases or decreases the preset count designated by the count preset signal S2 in accordance with the lag time of the reference marks and then the composite image is read.

In the embodiment of FIG. 9, it is assumed that the path length on the belt photoconductor 8 from the point F to the exposure area 50 is longer than the path length on the transparent film 30 from the point F' to the exposure area 38. If the path length relation is inverse, the drive timing of the photoconductor may be delayed by a smililar construction.

In accordance with the present embodiment, when the visualized image information in the image display apparatus and the image information additionally input in the display area are converted to the electrical signals by the image reader, the timings of the movement of the image carriers are controlled such that the positions of the original image and the additional image coincide. Accordingly, the composite image displayed in the display area is read by the image reader without disturbing the relative position of the images.

Referring to FIGS. 7, 8, 10 and 11, a fifth embodiment of the present invention is explained. The fifth embodiment uses a similar display apparatus to that of FIG. 8 and a similar signal processing system to that of FIG. 7, and hence explanation thereof is omitted.

Figure 10:
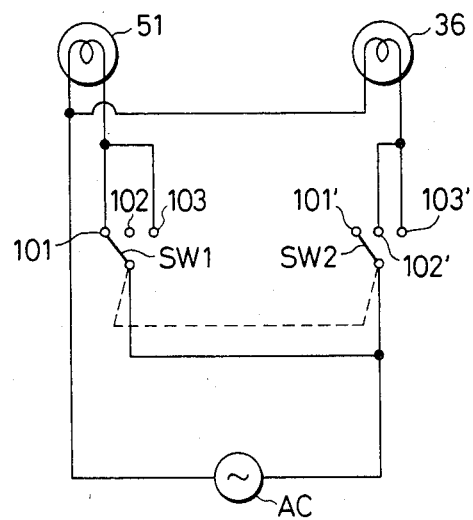
FIG. 10 shows a switching circuit for illumination lamps 36 and 51 of FIG. 8.

FIG. 10 shows a circuit of switches for the illumination lamps 36 and 51 of the apparatus of FIG. 8. SW1 and SW2 denote switches connected to an A.C. power supply AC and operated concurrently, numerals 101, 102 and 103 denote terminals (stationary contacts) of the switch SW1, and numerals 101', 102', and 103' denote terminals (stationary contacts) of the switch SW2.

The terminals 101 and 103 of the switch SW1 are connected to one terminal of the illumination lamp 51, the terminals 102' and 103' of the switch SW2 are connected to one terminal of the illumination lamp 36, and the terminals 102 and 101' are not connected to any of the illumination lamps 51 and 36. As the switches SW1 and SW2 are actuated, the terminals 101 and 101', the terminals 102 and 102' and the terminals 103 and 103' are connected in pair to the A.C. power supply AC.

When the switches SW1 and SW2 select the terminals 101 and 101' as shown in FIG. 10, only the illumination lamp 51 is turned on, and when the switches SW1 and SW2 select the terminals 102 and 102', only the illumination lamp 36 is turned on. When the switches SW1 and SW2 select the terminals 103 and 103', both the illumination lamps 36 and 51 are turned on. The switches SW1 and SW2 are switched by depressing one of actuation buttons (e.g..22') of the console 21 shown in FIG. 8.

By switching the ganged switches SW1 and SW2, one or both of the illumination lamp 36 which illuminates the image on the transparent film 30 and the illumination lamp 51 which illuminates the image on the belt photoconductor 8 are selectively turned on.

When only the image additionally written on the transparent film 30 or the second image carrier is to be converted to the electrical signal by the CCD 48, the switches SW1 and SW2 are switched to select the terminals 102 and 102' by the depression of the actuation button 22' so that only the illumination lamp 36 is turned on while the illumination lamp 51 is turned off. Thus, only the reflected image from the image on the transparent film 30 is read by the CCD 48 and converted to the electrical signal.

When only the image on the belt photoconductor 8 is to be read, the switches SW1 and SW2 are switched by the depression of the actuation button 22' to select the terminals 101 and 101' so that only the illumination lamp 51 is turned on while the illumination lamp 36 is turned off. Thus, only the reflected image from the image on the belt photoconductor 8 is read by the CCD 48.

When the image carried on the transparent film 30 and the image carried by the belt photoconductor 8 are to be read in optically superposition, the switches SW1 and SW2 are switched by the depression of the actuation button 22' to select the terminals 103 and 103' so that both of the illumination lamps 36 and 51 are turned on and the composite image is read by the CCD 48.

In the circuit of FIG. 7, the image information on the transparent film 30 or the photoconductor 8 is converted to the analog signal by the CCD 48, and the analog electrical signal image information is converted to the digital signal by the binarizing circuit 41, and the digital signal is sent out to the bus line 44 through the interface circuit 43 and sent to the optical disk unit 46 through the system controller 45 and stored in the optical disk by the optical disk unit 46.

The image information stored in the optical disk is read by the optical disk unit 46, read into the image display apparatus 40 through the bus line 44, supplied to the laser drive circuit 42 through the interface circuit 43 and visualized on the belt photoconductor 8 by the laser scanner 5.

Whether the image read by the CCD 48 is one of the image carried on the transparent film 30 and the image carried on the belt photoconductor 8 or the optically composite image of the both images, it is stored on the optical disk of the optical disk apparatus 46 separately from other image information and read from the optical disk a required and displayed on the image display apparatus 40 or supplied to the system controller 45 as the image information.

In order to achieve the above function, the present embodiment does not need a large capacity memory in the display apparatus and the apparatus is relatively inexpensive.

In the present embodiment, illumination of the lamps 36 and 51 is controlled by the depression of the actuation button 22' which designates one of the image carried on the transparent film 30 and the image carried on the belt photoconductor 8 or the optically composite image of the both images, to be read by the CCD 48. It may be controlled by other means as will be described later.

Figure 11:
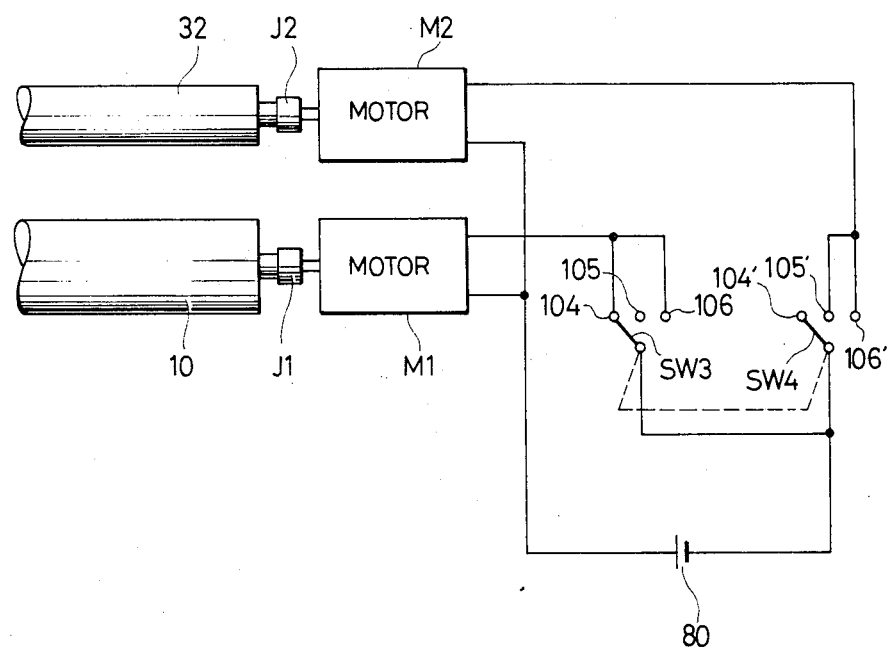
FIG. 11 shows a motor drive switching circuit.

FIG. 11 shows a sixth embodiment of the present invention. A motor M1 which drives the drive roller 10 of the belt photoconductor 8 and a motor M2 which drives the drive roller 32 of the transparent film 30 are coupled to roller shafts through joints J1 and J2, respectively. SW3 and SW4 denote ganged switches which are similar to the switches SW1 and SW2 and connect and disconnect the motors M1 and M2 to and from a power supply 80. Terminals 104 and 106 of the switch SW3 are connected to one terminal of the motor M1, terminals 105' and 106' of the switch SW4 are connected to one terminal of the motor M2, and terminals 105 and 104' are not connected to any one of the motors.

When the switches SW3 and SW4 select the terminals 104 and 104' respectively as shown in FIG. 11, only the motor M1 is driven and only the drive roller 10 of the belt photoconductor 8 is driven.

When the switches SW3 and SW4 select the terminals 105 and 105' respectively, only the motor M2 is driven and only the drive roller 32 of the transparent film 30 is driven.

When the switches SW3 and SW4 select the terminals 106 and 106' respectively, the motors M1 and M2 are driven and the drive rollers 10 and 32 are simultaneously driven.

In this manner, one of both of the driver rollers 10 and 32 can be selectively driven by switching the ganged switches SW3 and SW4.

Accordingly, when only the image additionally written on the transparent film 30 or the second image carrier is to be read by the CCD 48, only the motor M2 is driven by the switches SW3 and SW4 to drive the transparent film 30 so that only the image on the film 30 is scanned in the exposure area 38 shown in FIG. 8. Since the belt photoconductor 8 is not driven at this time, the CCD 48 converts only the reflected image from the image on the transparent film 30 to the electrical signal.

When only the image carried on the belt photoconductor 8 is to be read by the CCD 48, only the motor M1 is driven by the switches SW3 and SW4 so that only the image on the belt photoconductor 8 is scanned in the exposure area 50 and converted to the electrical signal by the CCD 48.

When the image carried on the transparent film 30 and the image carried on the belt photoconductor 8 are to be read in superposition, both the motors M1 and M2 are driven by the switches SW3 and SW4 so that the images carried on the transparent film 30 and the belt photoconductor 8 are scanned in the exposure areas 38 and 50 respectively, and optically superimposed and focused onto the CCD 48 which converts the composite image to the electrical signal. Thus, the present embodiment offers the same advantages as those of the fifth embodiment.

In accordance with the present embodiment, the original image displayed on the image display apparatus and the additional image information are optically superimposed and combined and the composite image information is converted to the electrical signal. When required, only the additional image information can be converted to the electrical signal.

The image display apparatus of the present invention is not limited to the illustrated embodiments but it is applicable to a display apparatus in which toner image is formed on a known electronic photographic photoconductor by a known charging and exposing process and the toner image is erased by cleaning means to allow repetitive use of the photoconductor or a display apparatus an erasable image is formed on a belt-like sheet by ink jet or on a thermo-sensitive sheet by a thermal head.

The present invention is not limited to the illustrated embodiments but various modifications thereof may be made within a scope of the appended claims.

What is claimed is:

1. An image display apparatus comprising:
   a first image carrier;
   image signal input means;
   image forming means for forming an erasable image on said first image carrier in accordance with an image signal input from said image signal input means;
   a display area for displaying thereon the image formed on said first image carrier;
   a second image carrier associated with said first image carrier;
   means for photoelectrically reading a visible image carried on said second image carrier and converting the visible image to an image signal; and
   means for automatically erasing the visible image carried on said second image carrier after the visible image is converted to an image signal.

2. An image display apparatus according to claim 1 wherein said second image carrier allows additional recording of new image information thereon.

3. An image display apparatus according to claim 2 wherein said second image carrier extends along and in parallel to a display plane of said first image carrier and is transparent.

4. An image display appartaus according to claim 1 wherein said image forming means includes irradiation means for irradiating a beam to said first image carrier and developing means for developing said first image carrier irradiated by said beam.

5. An image display apparatus comprising:
   a first image carrier;
   image signal input means;
   image forming means for forming an erasable image on said first image carrier in accordance with an image signal input from said image signal input means;
   a display area for displaying thereon the image formed on said first image carrier;
   a second image carrier associated with said first image carrier;
   means for photoelectrically reading a visible images carried on said first image carrier and said second image carrier converting the visible images to one image signal; and
   means for erasing the visible image carried on said second image carrier.

6. An image display apparatus according to claim 5 wherein said second image carrier allows additional recording of new image information thereon.

7. An image display apparatus according to claim 5 wherein said second image carrier extends along and in parallel to a display plane of said first image carrier and is transparent.

8. An image display apparatus according to claim 5 wherein said image forming means includes irradiation means for irradiating a beam to said first image carrier and developing means for developing said first image carrier irradiated by said beam.

9. An image display apparatus according to claim 5 further comprising control means for controlling start timings of drive of said first image carrier and said second image carrier.

10. An apparatus according to claim 5, wherein said erasing means automatically erases the visible image carried on said second image carrier after the visible image is read.

11. An apparatus according to claim 5 wherein said reading means reads the visible image carried on said first image carrier and the visible image carried on said second image carrier at the same time.

12. An image display apparatus comprising:
    a first image carrier;
    image signal input means;
    image forming means for forming an erasable image on said first image carrier in accordance with an image signal input from said image signal input means;
    a display area for displaying thereon the image formed on said first image carrier;
    a second image carrier associated with said first image carrier;
    means for selecting at least one of the visible image carried on said first image carrier and the visible image carried on said second image carrier to be read; and
    means for photoelectrically reading the selected visual images carried on at least one of said first image carrier and said second image carrier and converting the visual images to image signals.

13. An image display apparatus according to claim 12 wherein further comprising means for designating the carrier to be read by said reading/converting means.

14. An image display apparatus according to claim 12 wherein said second image carrier extends along and in parallel to a display plane of said first image carrier and is transparent.

15. An image display apparatus according to claim 12 wherein said image forming means includes irradiation means for irradiating a beam to said first image carrier and developing means for developing said first image carrier irradiated by said beam.

* * * * *

UNITED STATES PATENT AND TRADEMARK OFFICE
CERTIFICATE OF CORRECTION

PATENT NO. : 4,723,138
DATED : February 2, 1988
INVENTOR(S) : NORIO HASHIMOTO, ET AL.

It is certified that error appears in the above-identified patent and that said Letters Patent is hereby corrected as shown below:

COLUMN 1
    Line 12, "a" should read --as--.
    Line 55, "to" should be deleted.
    Line 60, "ar" should read --are--.

COLUMN 2
    Line 26, "to" should be deleted.
    Line 30, "telepthate" should read --terephthalate--.
    Line 41, "carries e" should read --carriers e--.

COLUMN 3
    Line 5, "to" should be deleted.
COL. 5 Line 57, "ar" should read --are--.
    Line 63, "31A" should read --131A--.

COLUMN 6
    Line 9, "drive motor 137," should read --drive roller 137,--.
    Line 56, "to" should be deleted.

COLUMN 7
    Line 21, "cleaned" should read --is cleaned--.
    Line 43, "Those" should read --The--.
    Line 66, "optical disk 46," should read --optical disk unit 46,--.

UNITED STATES PATENT AND TRADEMARK OFFICE
CERTIFICATE OF CORRECTION

PATENT NO. : 4,723,138
DATED : February 2, 1988
INVENTOR(S) : NORIO HASHIMOTO, ET AL.

It is certified that error appears in the above-identified patent and that said Letters Patent is hereby corrected as shown below:

COLUMN 9
    Line 39, "cleaned" should read --is cleaned--.
    Line 56, "transparent film" should read --transparent film 30--.

COLUMN 11
    Line 47, "F/F 44" should read --F/F 64--.
    Line 59, "tioned the" should read --tioned, the--.

COLUMN 12
    Line 29, "smililar" should read --similar--.

COLUMN 13
    Line 27, "optically" should read --optical--.
    Line 54, "a" should read --as--.

COLUMN 14
    Line 26, "of both" should read --or both--.

COLUMN 15
    Line 1, "apparatus an" should read --apparatus in which an--.
    Line 34, "appartaus" should read --apparatus--.
    Line 51, "a" should be deleted.

UNITED STATES PATENT AND TRADEMARK OFFICE
CERTIFICATE OF CORRECTION

PATENT NO. : 4,723,138

DATED : February 2, 1988

INVENTOR(S) : NORIO HASHIMOTO, ET AL.

It is certified that error appears in the above-identified patent and that said Letters Patent is hereby corrected as shown below:

Line 53, "converting" should read --and converting--.

COLUMN 16
    Line 4, "claim 5" should read --claim 6--.
    Line 45, "wherein" should be deleted.

Signed and Sealed this

First Day of November, 1988

Attest:

DONALD J. QUIGG

Attesting Officer

Commissioner of Patents and Trademarks